3,582,354
ADDITIVES FOR BAKERY PRODUCTS
Thomas P. Kichline, Chesterfield, and James F. Conn.,
St. Louis, Mo., assignors to Monsanto Company, St. Louis, Mo.
No Drawing. Filed Sept. 13, 1968, Ser. No. 759,796
Int. Cl. A21d 13/08
U.S. Cl. 99—91    12 Claims

ABSTRACT OF THE DISCLOSURE

Compounds having the following formula:

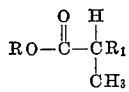

wherein R is a saturated, ethylenically unsaturated, or diethylenically unsaturated aliphatic hydrocarbon radical having from about 12 to about 22 carbon atoms and $R_1$ is a radical having the following formula:

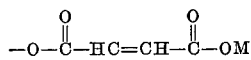

wherein M is H, alkali metal, alkaline earth metal or ammonium when used as emulsifiers in bakery products improve the quality of the bakery products.

---

This invention relates to novel compounds useful in bakery products and more particularly to such compounds employed as emulsifiers in the production of bakery products and to bakery processes employing the same.

Emulsifiers have been widely used in bakery products such as cakes, coffee rolls, bread, and the like. Although emulsifiers are used in making various breads, "bread," as used herein, refers to yeast-leavened bread produced with wheat flour or other cereal flours. Normally, bread is produced by either the older conventional process or the newer continuous process. In general, the conventional process refers to those methods of making bread which consist of mixing flour, water, and necessary additives, to form a dough which is developed during the fermentation that starts during the mixing and continues up to a relatively short time before the bread is completely baked. In contrast, the continuous process, refers to those methods of producing bread wherein the dough is mechanically developed by high speed mixing after flour and other essential additives have been added to a liquid brew medium in which a major portion of the fermentation has occurred prior to adding most of the flour and other additives. Emulsifiers are used in the production of cakes, especially in cake mix formulations.

Emulsifiers are used to improve the qualities of the bakery product. Desirable cake qualities include good height, proper size, good texture and proper pH. Desirable bread qualities include good volume, tender crust, fine grain, good aroma, taste and toasting properties. Consumers, generally, prefer bread that is soft, often this is the deciding factor considered in selecting a loaf of bread, and continuing to purchase the same brand of bread. Bakers have used emulsifiers in bread to improve softness and to impart other desirable qualities mentioned above. However, in some cases commercially available emulsifiers have not been effective or because of their high cost have not been used. Some emulsifiers lower the melting point of shortening and cannot be used in bread production. The mono- and di-glycerides are commercially available emulsifiers that can be used in bread production, however, they are expensive. It is believed, therefore, a novel relatively inexpensive, and easy way to prepare emulsifiers for bakery products which improves the quality of a bakery product produced would be a significant advancement in the art.

In accordance with this invention, novel compounds hereinafter described have been discovered that are useful as emulsifiers in preparing bakery products with improved qualities. By using these novel compounds, an improved bread having among other things, soft texture, good volume a tender crust, fine grain, good aroma, taste and toasting qualities is produced. By employing the novel compounds and an edible fat, a novel shortening agent is also produced. The novel compounds are easily prepared by standard esterification reactions and are less expensive than most commercially available emulsifiers for bakery products.

The compounds which have been found useful as emulsifiers for bakery products and particularly useful in the production of bakery products are compounds having the following formula:

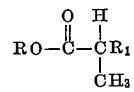

wherein R is a saturated, ethylenically unsaturated, or diethylenically unsaturated aliphatic hydrocarbon radical having from about 12 to about 22 carbon atoms; $R_1$ is a radical having the following formula:

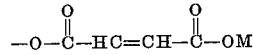

wherein M is H, alkali metal, alkaline earth metal or ammonium. $R_1$ can be either the cis or trans form.

Examples of these compounds include the linear alkyl lactoyl fumarates, maleates or salts thereof such as: tetradecyl lactoyl fumarate, hexadecyl lactoyl fumarate, octadecyl lactoyl fumarate, eicosyl lactoyl fumarate, dodecyl lactoyl maleate, tetradecyl lactoyl maleate, pentadecyl lactoyl maleate, octadecyl lactoyl maleate, nonadecyl lactoyl maleate, tetradecyl lactoyl fumarate sodium salt, octadecyl lactoyl fumarate potassium salt, hexadecyl lactoyl maleate calcium salt, and eicosyl lactoyl maleate ammonium salt. Examples of branched chain alkyl lactoyl fumarates, maleates and salts thereof include 7-ethyl tetradecyl lactoyl fumarate, 9-methylheptadecyl lactoyl fumarate, 12-methyleicosyl lactoyl fumarate, 6-butyltetradecyl lactoyl maleate, 4-methylhexadecyl lactoyl fumarate sodium salt, 12-ethyloctadecyl lactoyl fumarate lithium salt, 11-propyltridecyl lactoyl maleate potassium salt and 6-butyloctadecyl lactoyl maleate ammonium salt. Illustrative linear alkenyl lactoyl fumarates include, 12-octadecenyl lactoyl fumarate, 14-hexadecenyl lactoyl fumarate, 2-tetradecenyl lactoyl fumarate, 4-eicosenyl lactoyl maleate, 3-monadecenyl lactoyl maleate, 8-tridecenyl lactoyl fumarate, 10-heptadecenyl lactoyl fumarate potassium salt, 2-tridecenyl lactoyl fumarate calcium salt, 5-hexadecenyl lactoyl maleate magnesium salt, and 7-tetradecenyl lactoyl maleate ammonium salt. Examples of branched chain alkenyl lactoyl fumarates, maleates and salts thereof include: 6-methyl-2-hexadecenyl lactoyl maleate, 12-ethyl-5-octadecenyl lactoyl maleate, 13-methyl-7-tetradecenyl lactoyl maleate, 5-propyl-6-tridecenyl lactoyl maleate, 4-butyl-13-eicosenyl lactoyl maleate, 7-ethyl-2-pentadecenyl lactoyl maleate, 4-butyl-2-dodecenyl lactoyl fumarate potassium salt, 5-methyl-6-hexadecenyl lactoyl fumarate lithium salt, 5-methyl-7-heptadecenyl lactoyl maleate lithium salt and 10-methyl-11-docosenyl sodium salt. Illustrative linear alkadecadienyl lactoyl fumarates, maleates and salt thereof include 2,4-tetradecadienyl lactoyl fumarate; 6,8-hexadecadienyl lactoyl fumarate; 8,10-octadecadienyl lactoyl fumarate; 2,4-pentadecadienyl lactoyl maleate; 4,6-heptadecadienyl lactoyl fumarate; 6,8-eicosadienyl lactoyl maleate; 8,10-hexadecadienyl lactoyl fumarate sodium salt; 2,5-monodecadienyl lactoyl fumarate lithium salt; 4,6-dodecadienyl lactoyl maleate potassium salt and 6,8-tridecadienyl lactoyl maleate ammonium salt. Illustrative branched chain alkadienyl fumarates, maleates and salts thereof include 6-methyl-2,4-hexadienyl lactoyl fumarate; 6-ethyl-2,4-heptadienyl lactoyl fumarate; 2-propyl-3,5-nonadecadienyl lactoyl fumarate; 1 - butyl - 2,4-eicosadienyl lactoyl maleate; 5 - methyl - 2,8 - tridecadienyl lactoyl maleate; 2 - butyl - 3,7 - hexadienyl lactoyl maleate; 4 - ethyl - 2,5 - tetradienyl lactoyl fumarate sodium salt; 4 - butyl - 2,7 - hexadienyl lactoyl fumarate magnesium salt; 6 - propyl - 2,4 - tridecadienyl lactoyl maleate potassium salt and 5 - ethyl - 3,7-nonadecadienyl lactoyl maleate lithium salt. Mixtures of the above compounds can be used such as dodecyl-pentadecyl lactoyl fumarate, tetradecyl-octodecyl lactoyl fumarate, hexadecyl-eicosyl lactoyl maleate, tridecenylheptadecenyl lactoyl maleate or hexadecenyl-eicosenyl lactoyl fumarate.

Especially preferred compounds include the linear alkyl lactoyl fumarates having 14 to 20 carbon atoms in the alkyl group. Either the dextro or levo isomer of the above mentioned compounds can be used, however, it is preferred to use a mixture of equal amounts of the dextro and levo isomers.

The novel compounds can be prepared by reacting alcohols having about 12 to about 22 carbon atoms in the chain with lactic acid and either, maleic anhydride, maleic acid, fumaric acid, or fumaric halides.

The dextro or levo isomer of lactic acid can be used, however, it is preferred to use a mixture of equal amounts of the two isomers. Suitable saturated alcohols include the branched or linear alcohols having 12 to 22 carbons such as, 1 - tetradecanol, 6 - methyloctadecane - 1-ol, 2 - nonadecanol, 4 - ethylpentadecane - 1-ol, 1-eicosanol, 4 - butylheptadecane - 1 - ol, 5 - ethyldodecane - 1-ol, 1-docosanol, 1- hexadeconal, and 1 - octadecanol. Illustrative linear and branched unsaturated compounds include; 6 - tetradecene - 1-ol, 5-methyl-2-tridecene-1-ol, 4-butyl-2-pentadecene - 1 -ol, 4 - hexadecene - 1-ol, 7-heptadecene-1 - ol, 8 - butyl - 4 - octadecene-1-ol, 2-docosaene-1-ol, 6 - methyl - 3 - docosaene - 1 - ol, and 1-dodecane-1-ol. Illustrative linear and branched diolefinic alcohols include: 2,4 - hexadecandiene - 1 - ol; 7,10 - tridecandiene-1-ol; 6 - methyl - 4,7 - pentadecadiene - 1 - ol; 4 - ethyl - 7,9-octadecadiene - 1 - ol; 2,4 - heptadecadiene-1-ol; 6-butyl-2,4-eicosadiene-1-ol; and 2,4-octadiene-1-ol.

Especially preferred are the straight chain saturated alcohols having about 12 to about 22 carbon atoms.

In accordance with this invention, the novel compounds can be prepared by standard esterification reactions, for example, one of the aforementioned alcohols can be reacted with lactic acid to form the alkyl lactate and in turn the alkyl lactate is then reacted with maleic anhydride or fumaric acid to form the alkyl lactoyl monofumarate. Generally, a catalyst is employed to convert or isomerize the maleic acid or anhydride starting material to the corresponding fumarate. Illustrative catalyst include halogen, acids, such as HCl, or a cationic exchange resin, such as a polystyrene sulfuric acid type or sulfonated styrene divinyl benzene commercially available or Dowex 50W-X4. By analyzing the compounds acid number, saponification equivalent, hydroxyl percent and melting range can be determined. Acid number is the milligrams of potassium hydroxide required to neutralize one gram of material. The saponification equivalent is equal to the weight of the sample times 1,000 divided by the milliequivalents of potassium hydroxide required to saponify the sample. In order to determine hydroxyl content, the samples are refluxed with an acetic anhydride pyridine mixture and then neutralized with standard alkali to determine milliequivalents of acetic anhydride esterified. Melting ranges are determined by a Fisher-Johns Melting Point apparatus.

Preparation of the above mentioned salts can be accomplished in one of several conventional ways whereby the desired metal hydroxide is applied as a reagent in an aqueous alcoholic or aqueous system. In practice, it is preferable to use an aqueous alcoholic or aqueous acetone solution of the ester which contains an equivalent quantity of mole of a suitable metal hydroxide. The desired salt precipitates out quickly from the solution, practically immediately after the completion of this step. Other solvents which can be used in place of acetone in this reaction are, for example, other lower alkyl ketones such as methyl ethyl ketone, diethyl ketone, methyl isoamyl ketone, and the like, while suitable alcoholic solvents, for example, are lower alkanols such as methanol, ethanol, isopropanol, 2-butanol and 2-amyl alcohol and the like. The calcium-monoalkyl maleates and/or fumarates can also be prepared from the corresponding monoalkali compounds thus formed, as well as the magnesium compounds, by means of a simple reaction whereby a suitable alkaline-earth metal halide, such as calcium chloride or magnesium bromide is used in an aqueous system in order to obtain the desired calcium or magnesium salt.

Any suitable equipment can be used to prepare the novel compounds of this invention, for example, a vessel equipped with a heating mantle, a thermometer, and stirrer can be used. Generally, a condenser is attached to this vessel in order to collect the product as the reaction mixture is being refluxed.

As mentioned before, the novel compounds of this invention are used as emulsifiers in bakery products to improve the properties of these products. These compounds are used as emulsifiers in bakery products in an amount of about .05 part by weight to about 12 parts by weight per 100 parts by weight of flour. These compounds are especially effective in the production of bread. They aid in developing the creamy texture of the shortening in order to produce a rich tender bread. They tend to make the bread softer to prevent aging and increase shelf life. These compounds are used as emulsifiers in the production of bread in an amount of about 0.01 part by weight to about 2 parts by weight per 100 parts by weight of flour and preferably from about 0.05 part by weight to about 0.75 part by weight per 100 parts by weight of flour. These compounds are used as emulsifiers in the production of cakes in an amount of about .1 part by weight to about 10 parts by weight per 100 parts by weight of flour and preferably from about 1.5 parts by weight to about 5 parts by weight per 100 parts by weight of the flour.

The novel emulsifiers can be used in the conventional process for baking bread or in the newer continuous process for the production of bread.

In the conventional process for producing yeast leavened bread, several ingredients such as water, yeast, yeast food, salt, sugar, malt, milk solids, shortening buffering agents, oxidants are combined with the flour to thereby form a dough. Examples of shortening include the hydrogenated vegetable oils and lard. The term "shortening" as used herein means shortening that does not include an emulsifier. The term "shortening agent" refers to shortening that does contain an emulsifier. Generally, the yeast food is made up of an ammonium salt, oxididing agents such as potassium bromate or iodate and a calcium salt such as calcium sulfate or monocalcium phosphate. The straight dough method and the sponge and dough method are the two methods commonly used in bread manufacture by the conventional process. In the straight dough method, all of the ingredients are mixed together in a single batch, the ingredients are allowed to ferment for about 2 to about 5 hours, then the dough is subjected to the steps of dividing, rounding, intermediate proofing, molding, panning and final proofing before baking. The fermentation starts during initial mixing and continues up to a relatively short time before the bread is completely baked. In the sponge and dough method, part of the ingredients are mixed together to form a sponge. For example, about 50 to 75% of the flour is mixed with yeast, yeast food, malt, and buffering agents to form a sponge (first stage mixing operation). The fermentation proceeds for 3 to 5 hours in the sponge before the remaining flour, milk solids, shortening, sugar, and other ingredients are added and mixed (second stage mixing operation). After these latter ingredients have been added, the dough is allowed to relax for about 10 to about 40 minutes, after which the subsequent steps of dividing, rounding, proofing, molding, and baking are conducted. Generally, most bakeries that produce conventional bread use the sponge and dough method. In both methods during the fermentation step, the cell structure is chemically developed to strengthen the cell wall which increases carbon dioxide retention without rupturing the cell walls.

Beneficial results are achieved in the practice of this invention by incorporating the emulsifier into the bakery product at any stage prior to baking. When employing the conventional bread making process the emulsifier can be added at any time prior to baking, but it is preferred to add the emulsifier at the second stage mixing operation in those methods where the bread making ingredients are added at different stages. For example in the straight dough method the emulsifier would be added at any time prior to baking and in the sponge and dough method it would be added at the second stage mixing operation hereinbefore mentioned.

Although the manner of adding the emulsifier can depend upon the stage of the process at which it is added, in general, any conventional means for adding them to the baking process can be used, for example, the emulsifier can be admixed with the other dough forming ingredients at the time of preparation of the dough in a straight dough method or the emulsifier may be added with the remaining ingredients such as flour, milk, shortening and sugar in the sponge and dough method. The emulsifier may be added in the form of a water suspension or a solid.

In the continuous process, as previously mentioned, the fermentation occurs in the brew. One method commonly used employs a blending tank in which such ingredients as sugar, yeast, yeast food, buffering agents, and up to about 50% of the flour are suspended (first stage mixing operation). The brew is transferred to one of the two hold tanks with one being filled as the contents of the other are being used. The liquid ferment, after being in the hold tank for about two and a half hours, flows to another tank in which more fermentable sugar can be added. The material from this tank enters a mixer where the balance of flour, shortening and oxidant such as aqueous solutions of potassium bromate and/or potassium iodate, are added (second stage mixing operation). The dough is then transferred to a high speed mixer where the dough is developed in about 1 to 2 minutes. Directly attached to this mixture is a divided panner which extrudes and cuts the dough into individual pieces of exact and uniform weight and drops them into baking pans. The final proofing is conducted under relatively warm and relatively high humidity conditions for about 30 to about 70 minutes just prior to baking. Another commonly used continuous bread process is similar, however, little or no flour is added to the brew. The brew is made by adding ingredients of water, sugar, yeast, yeast food, buffering agents in several tanks (first stage mixing operation). Fermented brew is then pumped to the hold tank from which it is transferred to a premixer where the flour, shortening, oxidant and any other dough forming ingredients are added (second stage mixing operation). From the premixer to baking the two methods are essentially identical.

Although in the practice of this invention beneficial results can be achieved by incorporating the emulsifier into the bread process at any time prior to baking, it is especially preferred to incorporate the emulsifier into the process at the second stage mixing operation hereinbefore mentioned. The emulsifier can be added to the process in the same manner as the other ingredients for example, the proper amount of the emulsifier can be added as a solid during this stage. In addition the emulsifier can be suspended in water and then added. Another suitable method is to admix the emulsifier with the shortening agent and add this during the second stage mixing operation. In general, any means of adding the emulsifier of this invention to the process prior to baking may be used.

The novel compounds of this invention are used in the production of cakes, especially in cake mixes. Generally, in these mixes, flour, nonfat dry milk, salt, flavoring agents such as vanilla or cocoa; soda and leavening acids such as sodium aluminum phosphate, sodium acid pyrophosphate, anhydrous monocalcium phosphate, and monocalcium phosphate monohydrate are first mixed together. Then sugar, shortening and emulsifiers are blended together and added to the other ingredients. The cake mix is then passed through a finisher to get uniform distribution.

To prepare a cake, the dry mix, water and egg are blended together forming a batter. This batter is placed in baking pans and baked in an oven.

The novel compounds useful as emulsifiers in cake mixes can be added to the mix in any manner with any of the other ingredients. It is preferred to blend the emulsifier with the shortening and sugar and add this to the other ingredients.

In accordance with this invention a novel shortening agent is prepared which comprises an edible fat and an emulsifier, one of the novel compounds hereinbefore described. Generally, the emulsifier is used in an amount of about 1% by weight to about 160% by weight based on the weight of the fat and preferably from about 5% by weight to about 95% by weight based on the weight of the fat. Suitable fats include, lard, hydrogenated vegetable oils, and long chain fatty acid esters of glycerin. A particularly effective shortening agent comprises n-octadecyl lactoyl monofumarate present in an amount 8% by weight to about 12% by weight based on the weight of the edible fat lard. Another effective shortening comprises hexadecyl lactoyl fumarate present in an amount of about 8% to about 12% based on the weight of the edible fat lard. Another effective shortening comprises hexadecyl lactoyl fumarate present in an amount of about 8% to about 12% based on the weight of the edible fat, made up of lard, 83% by weight, fairly hydrogenated lard flakes 10% by weight, and monostereate glyceride 7% by weight.

The amount of the novel shortening agent used in bakery products is generally about 0.1 part by weight to about 65 parts by weight per 100 parts by weight of flour. The amount of the shortening agent used in bread products is generally about 0.5 part by weight to about 35 parts by weight per 100 parts by weight of flour. The amount of shortening agent used in cake products is generally about 5 parts by weight to about 60 parts by weight per 100 parts by weight of flour.

In general, the shortening agents are added to bakery processes in the same manner as hereinbefore described in place of the shortening. Of course, it is not necessary to use any additional shortening or an emulsifier. The novel shortening agent can be prepared in the usual manner, for example, the emulsifier is dissolved in the shortening.

To illustrate the advantages of this invention, the following examples are given.

EXAMPLE I

Into a suitable mixing vessel having a means for heating, a thermometer, and stirrer are charged 646 parts of tetradecanol and 540.4 parts of a 50% aqueous solution of lactic acid. The temperature is raised to about 105° C.

to 125° C. at which point the distillate starts to collect. Then the temperature is gradually increased during a period of 1.75 hours to a reflux temperature of about 205° C. to about 220° C. The mixture is refluxed for about 1 hour and the material is collected, purified and analyzed. The tetradecyl lactate had a melting range of about 21° C. to 23° C., an acid number of 7.01, a saponification equivalent of 295.8 and a hydroxyl percent of 5.93. 291 parts of tetradecyl lactate and 98 parts of maleic anhydride are charged into a similarly equipped mixing vessel, heat is applied until a reflux temperature of about 218° C. to 232° C. is reached in about 30 to about 60 minutes.

This material is collected and purified. The yield is about 384 parts of tetradecyl lactoyl fumarate that has a melting range of 31 to 34° C., an acid number of 114.8, a saponification equivalent of about 179.8 and a hydroxyl percent of 1.84.

EXAMPLE II

Into a suitable mixing vessel are charged 744 parts of hexadecanol and 540 parts of a 50% solution of lactic acid. The temperature is raised to about 105 to 125° C. at which point distillate first starts to collect. Then the temperature is gradually increased to a reflux temperature of 218 to 227° C. This temperature is maintained for about 1.25 hours. The material is collected and yields about 964 parts of hexadecyl lactate which had a melting range of 32 to 34° C., an acid number of 5.54, a saponification equivalent of 328.8 and a hydroxyl percent of 5.38. 321 parts of this hexadecyl lactate and 98 parts of maleic anhydride are charged into the mixing vessel and heat is applied until a reflux temperature is reached in about 30 to about 60 minutes. This material is refluxed at a temperature of about 228° C. to about 224° C. for about 1.5 hours. About 410 parts of this material, hexadecyl lactoyl fumarate, is collected and an analysis shows that it has a melting range of 39 to 40° C., an acid number of 98.97, a saponification equivalent of 185.6 and a hydroxyl percent of 2.06.

EXAMPLE III

Into a suitable mixing vessel are charged 528 parts of octadecanol and 204 parts of an 88 percent solution of lactic acid, and heated to a temperature of 105 to 125° C. The temperature is gradually increased for a period of about 1 to 1.75 hours to a reflux temperature of 195 to 205° C. This material is refluxed at this temperature for about 1 hour. The material is collected yielding about 674 parts of octadecyl lactate. An analysis shows that it has a melting range of 33 to 34° C., an acid number of 7.06, a saponification equivalent of 347.8 and a hydroxyl percent of 5.14. About 339 parts of octadecyl lactate and 98 parts of maleic anhydride are charged into a suitable mixing vessel. The temperature is raised to the reflux temperature of 145° C. to 155° C. over a period of 30 to 60 minutes. This mixture is then refluxed for about 4 hours. The material is purified yielding about 433 parts of octadecyl lactoyl fumarate. An analysis shows that it has a melting range of 34 to 36° C., an acid number of 135.9, a saponification equivalent of 229.3 and a hydroxyl percent of 3.42.

EXAMPLE IV

Into a suitable mixing vessel are charged 590 parts of eicosyl alcohol and 204 parts of an 88% solution of lactic acid. This mixture is then heated to a reflux temperature of 190° C. to about 200° C. The mixture is refluxed at this temperature for about 30 minutes. A yield of 738.5 parts of eicosyl lactate is recovered. This material has a melting range of 40 to 41° C., an acid number of 9.09, a saponification equivalent of 392.1 and a hydroxyl percent of 5.67. 185 parts of eicosyl lactate and 98 parts of maleic anhydride are charged into a suitable mixing vessel. Heat is applied to bring the temperature to about 148 to 150° C. in about 30 to 60 minutes. This mixture is refluxed at this temperature for about 4 hours. The material is purified yielding about 466 parts of eicosyl lactoyl fumarate having a melting range, of about 42 to 45° C., an acid number of 128.5, a saponification equivalent of 250.8 and a hydroxyl percent of 3.91.

EXAMPLE V

Into a suitable mixing vesel are charged 370 parts of eicosyl lactate prepared in the same manner as Example IV and 117 parts of fumaric acid. The temperature is gradually increased until the reflux temperature of 239 to about 245° C. is reached. The mixture is then refluxed at this temperature for about 1 hour. After purification, there is a yield of 459 parts of eicosyl fumarate. This material has a melting range of 46 to 48° C., an acid number of 103.2, a saponification equivalent of 212.5 and a hydroxyl percent of 1.79.

EXAMPLE VI

Into a suitable mixing vessel are charged 500 parts of 2-tetraadecene-1-ol and 500 parts of a 50% solution of lactic acid. The temperature is generally increased until a reflux temperature of about 210° C. is reached. This material is refluxed at this temperature for about 90 minutes. There is a yield of about 300 parts of 2-tetradecenyl lactate. 286 parts of 2-tetradecenyl lactate and 95 parts of maleic anhydride are charged into a suitable mixing vessel. The temperature is gradually increased until the reflux temperature of about 200° C. to about 220° C. is reached. This mixture is refluxed for about 90 minutes. After purification there is a yield of about 260 parts of 2-tetradecenyl lactoyl fumarate.

EXAMPLE VII

About 238 parts of 2,3-hexadecadiene-1-ol and about 180 parts of a 50% solution of lactic acid are charged into a suitable mixing vessel. Heat is gradually added until a refluxing temperature of about 220° C. is reached. This material is then refluxed at this temperature for about 90 minutes, the material is then purified yielding about 260 parts, of 2,3-hexadecenyl lactate. About 156 parts of this material and about 48 parts of maleic anhydride are charged into a suitable mixing vessel, heat is gradually added until the reflux temperature is reached, this mixture is then refluxed for about 90 minutes. The material is collected and purified and yielded about 150 parts of 2,3-hexadecadenyl lactoyl fumarate.

EXAMPLE VIII

About 260 parts of a $C_{12}$ to $C_{15}$ alcohol are charged with about 180 parts of 50% aqueous solution of lactic acid and 10 parts of Dowex 50W–X4, catalyst, into a suitable mixing vessel. The temperature is raised to about 135° C. and refluxed for about 90 minutes. The material was purified and collected, this mixture yielded about 49 parts of a $C_{12}$ to $C_{15}$ alkyl lactate ester. About 167 parts of this material, 49 parts of maleic anhydride and 5 parts of Dowex 50W–X4 are charged into a suitable mixing vessel. The heat was gradually increased to a temperature of 125° C. to 130° C. The material is refluxed for about 6 hours. At the end of this period the material was collected and analyzed and yielded 100 parts of $C_{12}$–$C_{15}$ lactoyl fumarate.

EXAMPLE IX

Similar procedures as in Examples I and II are used to prepare tetradecyl lactoyl maleate and hexadecyl lactoyl maleate.

EXAMPLE X

Similar procedures as in Examples VI and VII are used to prepare 1-tridecyl lactoyl maleate and 2,3-hexadecadienyl lactoyl maleate.

The following examples will illustrate the beneficial advantages of the emulsifiers when used in the bakery products especially in bread products. Using the method of expression commonly used by the baking industry, all parts, percentages and proportions are by weight using flour as a base unless otherwise indicated.

EXAMPLE XI

In this example, yeast leavened breads employing the formulation given in Table I are prepared and baked under controlled conditions.

TABLE 1

| | |
|---|---|
| Flour (14% moisture basis) | 100 |
| Water (used to correct flour to 14% moisture) | Variable |
| Water (to produce dough) | 68 |
| Sugar—First stage 3 parts, second stage 5 parts | 8.0 |
| Nonfat dry milk | 2 |
| Salt | 2 |
| Yeast food | .45 |
| Oxidant (KBRO$_3$ and KIO$_3$) | 0.007 |
| Shortening | 3 |
| Emusifier [1] | 0.25 |

[1] See following definitions:
(a) tetradecyl lactoyl fumarate (product of Example I)
(b) hexadecyl lactoyl fumarate (product of Example II)
(c) conventional emulsifier, 66% monoglyceride.

The following procedure is used in the praparation of the breads. The water, yeast, first stage sugar, salt, nonfat milk solids, yeast food are mixed together and allowed to ferment at 86° F. for about 2½ hours. The flour second stage sugar, oxidant, shortening, and an aqueous dispersion of the emulsifier, are added to the brew and mixed at relatively low speeds for about 60 seconds to form a dough. Then the dough is developed for about 30 seconds to about 60 seconds using high speed mixing. After the dough is developed, equal weight portions of 425 grams are placed in individual pans and proofed for about 55 minutes in an atmosphere at 100° F. at 95 relative humidity. After baking the bread, samples were compared on the basis of volume, grain, texture, and crust. Volume is determined by measuring the height of the loaves. A perfect score for volume is 10 points. Grain and texture are scored subjectively by a panel of observers by observing samples which are obtained by slicing the loaf at about the middle and observing the two surfaces. A perfect score for either grain or texture is 20 points. The following table shows the results of these tests.

TABLE 2

| | Conventional emulsifier | Tetradecyl lactoyl fumarate | Hexadecyl lactoyl fumarate |
|---|---|---|---|
| Volume | 9.0 | 9 | 9 |
| Grain | 18 | 19 | 19 |
| Texture | 18 | 18 | 19 |
| Total | 45 | 46 | 47 |

The results of this test show that the bread prepared by using the novel emulsifiers of the present invention is superior to bread or equal to bread produced by the conventional emulsifier, monoglyceride. It can readily be appreciated that the emulsifier of the present invention is easily prepared and is substantially less expensive than the conventional monoglyceride. Other comparable bread can be produced in the same manner as described above by replacing the tetradecyl lactoyl fumarate with similar amounts of octadecyl lactoyl fumarate (product of Example III) or eicosyl lactoyl fumarate (product of Example IV). The resulting bread has good volume, grain texture, crumb color and taste characteristics. Other comparable breads can be produced in the same manner as described above by replacing similar amounts of tetradecyl lactoyl fumarate with 2-tetradecenyl lactoyl fumarate. Breads produced have good grain loaf and texture properties.

EXAMPLE XII

Bread is made using the continuous process with a 2 stage mixing operation. In the first stage 200 parts of flour, 30 parts of yeast, 50 parts of a yeast food composition and 650 parts of water, 20 parts of sugar, 20 parts of salt and 60 parts of nonfat dry milk solid are added to an agitated heated vesel. The yeast food composition contained about 50% by weight of calcium sulfate, 10% by weight of monocalcium orthophosphate, 15% by weight of monoammonium phosphate, 25% by weight sodium chloride and 10% by weight starch. The mixture (brew) is heated to about 65° F. to about 90° F. for about 45 minutes, after which the brew is transferred to an incorporator where 800 parts of flour, 30 parts of shortening, and about 3 parts of tetradecyl lactoyl fumarate (product of Example I) as an emulsifier, 0.06 part of potassium bromate and .015 part of potassium iodate are added and mixed to form a premixed dough (second stage mixing operation) which is developed by a high degree of mixing for about 60 seconds. The bread is proofed for 60 minutes in a chamber wherein the temperature is controlled at about 105° F. at 95% relative humidity. After the beforementioned proofing time the bread is placed in the oven and allowed to bake for about 18 minutes at 450° F. An identical bread is prepared except that hexadecyl lactoyl fumarate (product of Example II) is substituted as the emulsifier. Another identical bread is prepared with the exception that the emulsifier is tetradecyl lactoyl maleate.

The bread has good volume, and excellent grain texture, crumb color and taste characteristics and is suitable for commercial salt.

EXAMPLE XIII

In this example bread is produced by the conventional method. About 650 parts of low mixing tolerance flour (produced from hard red winter wheat), 25 parts of yeast, 70 parts of a yeast food composition and 390 parts of water are mixed together to form a sponge. The yeast food composition contained about 7% by weight of ammonium sulfate, about 8% by weight of monocalcium phosphate, about 10% by weight of monocalcium phosphate, about 10% by weight of monoammonium phosphate, 0.20% by weight of potassium bromate, 0.03% by weight of potassium iodate, about 20% by weight of salt and about 45% by weight of starch. The sponge is allowed to ferment for about 3.75 hours after which 350 parts of flour, about 250 parts of water, 50 parts of nonfat milk solids, 30 parts of shortening, 5 parts of octadecyl lactoyl fumarate (product of Example III), 20 parts of sugar, 5 parts of salt and about 1.5 parts of mold inhibitor are blended together with the sponge in a relatively low speed mixer for about 6.5 to about 12.0 minutes to form dough. The dough is allowed to relax for about 30 minutes, then is divided into loaves, rounded, rested for about 15 minutes, molded, placed into pans, allowed to proof for about 60 minutes, and then baked for about 25 minutes at about 430° F.

Identical samples are prepared using the same aforementioned processes except that eicosyl lactoyl fumarate (product of Example IV) and a monoglyceride are used as emulsifiers. The softness of the bread is determined in the following manner. After cooling the loaves for about an hour, the loaves are stored for about 3 days at room temperature in polybags. 3 cubes, 2″ x 2″ x 2″ of bread are cut from the loaf interior. Each cube is tested by placing a 301 gram plate on the cube and the percent compressibility is recorded after 30 seconds. If the top of the cube is pushed down ½″ it is 25% compressible; 1″, 50% compressible. The data of these tests are given below.

TABLE IV

| | Percent |
|---|---|
| Mono glyceride | 49 |
| Compressibility of crumb: | |
|    Octadecyl lactoyl fumarate | 56.7 |
|    Eicosyl lactoyl fumarate | 51.3 |

In addition to the improved quality of softness, the bread containing the emulsifiers of the subject invention have good qualities of texture, grain and volume and are commercially acceptable. Also other comparable breads can be prepared in the same manner as described above by replacing the emulsifier with similar amounts of 1-tetradecenyl lactoyl fumarate, hexadecenyl lactoyl fumarate, 1-octadecenyl lactoyl fumarate, 1-tetradecenyl lactoyl maleate and 1-heptadecenyl lactoyl maleate. The resulting bread has good volume, grain, texture, crumb color and taste characteristics.

EXAMPLE XIV

A novel shortening agent is prepared by dissolving 1 part of the emulsifier, tetradecyl lactoyl fumarate, in 6 parts of hydrogenated vegetable oil. The emulsifier is dissolved in the hydrogenated vegetable oil after the oil has been heated. Once there is a homogeneous mixture, it is allowed to cool down and the composition is ready to be used as in bakery products. Similar shortening compositions can be prepared by using similar amounts of hexadecyl lactoyl fumarate and octadecyl lactoyl fumarate.

The novel shortening compositions are included in the preparation of bread by including them at the second stage mixing operation in the continuous process for the preparation of bread. This is done in the same manner as in Example XII. The bread produced had good texture, grain, and crust characteristics.

EXAMPLE XV

A cake mix is prepared having the following formula:

| | Parts |
|---|---|
| Flour | 1000 |
| Sugar | 1250 |
| Shortening | 240 |
| Emulsifier [1] | 27 |
| Non fat dry milk | 108 |
| Salt | 21.6 |
| Vanillin | 0.3 |
| Sodium bicarbonate | 20 |
| Sodium aluminum phosphate | 20 |

[1] Tetradecyl lactoyl fumarate (product of Example I).

All of the above ingredients with exception of sugar, shortening and emulsifier are mixed in suitable mixing vessel. The sugar, emulsifier and shortening are mixed in a suitable vessel, such as Hobart A-200 mixing bowl, then the other ingredients are added to the mixing vessel. The mix is stored for about 12 hours at 95° F. and then passed through a finisher.

Into a suitable mixing vessel, are added two egg whites, 568 grams of the dry mix and 300 grams of water and mixed for about four minutes forming a batter. The batter is divided equally into two eight inch diameter aluminum cake pans. The cakes are baked at 350° F. until done. The cakes are done when they spring back after being lightly touched on top. The cakes have good volume and texture.

What is claimed is:

1. An improved bakery product containing as an emulsifier a member selected from the group consisting of a compound having the following formula:

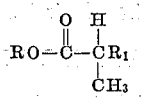

wherein R is selected from the group consisting of saturated, ethylenically unsaturated and diethylenically unsaturated aliphatic hydrocarbons; and $R_1$ is a radical having the following formula:

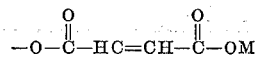

wherein M is selected from the group consisting of H, alkali metal, alkaline earth metal and ammonium and mixtures of such compounds; said emulsifier being present in an amount of 0.005 part to about 12 parts by weight per 100 parts by weight of flour.

2. An improved bread product according to claim 1 wherein said emulsifier is present in an amount of about 0.01 part by weight to about 2.0 parts by weight per 100 parts of flour.

3. An improved cake mix according to claim 1 wherein said emulsifier is present in an amount of about 0.1 part by weight to about 10 parts by weight per 100 parts by weight of flour.

4. An improved bakery product according to claim 1 wherein R is a straight chain radical.

5. An improved bread product according to claim 4 wherein said emulsifier is present in an amount of about 0.01 part by weight to about 2.0 parts by weight per 100 parts by weight of flour.

6. An improved cake mix according to claim 4 wherein said emulsifier is present in an amount of about 0.1 part by weight to about 10 parts by weight per 100 parts by weight of flour.

7. An improved bakery product according to claim 4 wherein R is selected from the group consisting of n-tetradecyl and n-hexadecyl, $R_1$ is the trans form of said radical and M is H.

8. An improved bread product according to claim 7 wherein said emulsifier is present in an amount of 0.01 part by weight to about 2.0 parts by weight per 100 parts by weight of flour.

9. An improved cake mix according to claim 7 wherein said emulsifier is present in an amount of about 0.1 part by weight to about 10 parts by weight per 100 parts by weight of flour.

10. An improved bakery product according to claim 4 wherein R is selected from the group consisting of n-octadecyl and n-eicosyl, $R_1$ is the trans form of said radical and M is H.

11. An improved bread product according to claim 10 wherein said emulsifier is present in an amount of about 0.01 part by weight to about 2.0 parts by weight per 100 parts by weight of flour.

12. An improved cake mix according to claim 10 wherein said emulsifier is present in an amount of about 0.1 part by weight to about 10 parts by weight per 100 parts by weight of flour.

References Cited

UNITED STATES PATENTS

| 3,144,341 | 8/1964 | Thompson | 99—92X |
| 3,180,736 | 4/1965 | Landfried | 99—91 |

RAYMOND N. JONES, Primary Examiner

J. R. HOFFMAN, Assistant Examiner

U.S. Cl. X.R.

99—86, 94, 118R; 260—485R